US010505942B2

(12) United States Patent
Sommerfelt et al.

(10) Patent No.: US 10,505,942 B2
(45) Date of Patent: Dec. 10, 2019

(54) SECURITY FOR ACCESSING STORED RESOURCES

(71) Applicant: Microsoft Technology Licensing, LLC, Redmond, WA (US)

(72) Inventors: Espen Sommerfelt, Oslo (NO); Håkon Brugård, Tromso (NO); Panagiotis Sakkos, Oslo (NO); Iuri Tolica, Oslo (NO); Øystein Torbjørnsen, Oslo (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 133 days.

(21) Appl. No.: 15/409,466

(22) Filed: Jan. 18, 2017

(65) Prior Publication Data
US 2018/0205739 A1 Jul. 19, 2018

(51) Int. Cl.
*G06F 21/62* (2013.01)
*H04L 29/06* (2006.01)
*G06Q 10/10* (2012.01)
*G06F 16/14* (2019.01)

(52) U.S. Cl.
CPC ............ *H04L 63/104* (2013.01); *G06F 16/14* (2019.01); *G06F 21/6218* (2013.01); *G06Q 10/101* (2013.01); *G06F 2221/2141* (2013.01); *G06F 2221/2147* (2013.01)

(58) Field of Classification Search
CPC . H04L 63/104; G06F 17/301; G06F 21/6218; G06F 2221/2141; G06F 2221/2147; G06Q 10/101
See application file for complete search history.

(56) References Cited

U.S. PATENT DOCUMENTS

| 5,220,657 | A | 6/1993 | Bly et al. |
| 5,555,371 | A | 9/1996 | Duyanovich et al. |
| 7,263,537 | B1 | 8/2007 | Lin et al. |
| 7,647,346 | B2 | 1/2010 | Silverman et al. |
| 8,099,463 | B2 | 1/2012 | Horowitz et al. |
| 8,181,111 | B1 | 5/2012 | Onyon et al. |
| 8,183,514 | B2 | 5/2012 | Fujiwara et al. |
| 8,250,145 | B2 | 8/2012 | Zuckerberg et al. |

(Continued)

FOREIGN PATENT DOCUMENTS

| CN | 104361034 A | 2/2015 |
| EP | 2947848 A1 | 11/2015 |
| WO | 2016153676 A1 | 9/2016 |

OTHER PUBLICATIONS

"Tenant Isolation in Microsoft Office 365", http://www.google.co.in/url?sa=t&rct=j&q=&esrc=s&source=web&cd=1&cad=rja&uact=8&ved=0ahUKEwjbzJql15zRAhXLL48KHcjmDHcQFggZMAA&url=http%3A%2F%2Fdownload.microsoft.com%2Fdownload%2F3%2FF%2F0%2F3F0420A2-657B-44B6-B21E-D7BD98A94390%2FTenant%2520Isolation%2520in%2520Office%2520365.pdf&usg=AFQjCNHik-DE_gJ_SdwX3aldp_ughjJMVg&bvm=bv.142059868,d.c2I, Published on: Nov. 9, 2016, pp. 1-15.

(Continued)

*Primary Examiner* — Joseph P Hirl
*Assistant Examiner* — Stephen T Gundry
(74) *Attorney, Agent, or Firm* — Merchant & Gould

(57) ABSTRACT

The present disclosure relates to a server system or other computer equipment for storing data of a first party and determining whether a second party is permitted access to that data based on metadata associated with the data. The disclosure provides a variety of techniques for reducing latency in a security check operation which involves reading this metadata to determine whether the second party is permitted access.

20 Claims, 6 Drawing Sheets

(56) References Cited

U.S. PATENT DOCUMENTS

| | | | |
|---|---|---|---|
| 8,453,068 B2 | 5/2013 | Stibel et al. | |
| 8,473,607 B2 | 6/2013 | Enscoe et al. | |
| 8,479,103 B2 | 7/2013 | DeLuca et al. | |
| 8,510,379 B2 | 8/2013 | Howes et al. | |
| 8,595,381 B2 | 11/2013 | Long | |
| 8,819,236 B2 | 8/2014 | Gkantsidis et al. | |
| 8,826,407 B2 | 9/2014 | Henderson | |
| 9,128,768 B2 | 9/2015 | Korovin et al. | |
| 9,135,304 B2 | 9/2015 | Oliver et al. | |
| 9,208,207 B2 | 12/2015 | Venkataramani et al. | |
| 9,219,736 B1 | 12/2015 | Lewis et al. | |
| 9,276,882 B2 | 3/2016 | Mok et al. | |
| 9,317,574 B1* | 4/2016 | Brisebois | G06F 17/30864 |
| 9,378,241 B1 | 6/2016 | Shankar et al. | |
| 9,378,303 B1 | 6/2016 | Shankar et al. | |
| 9,390,159 B2 | 7/2016 | Junkergard et al. | |
| 9,396,242 B2 | 7/2016 | Varley et al. | |
| 9,424,330 B2 | 8/2016 | Prasanna | |
| 9,465,830 B2 | 10/2016 | Wable et al. | |
| 9,588,849 B2 | 3/2017 | Sinha | |
| 9,760,446 B2* | 9/2017 | Hammer | G06F 16/00 |
| 9,779,260 B1* | 10/2017 | Brisebois | G06F 21/62 |
| 9,823,978 B2* | 11/2017 | Mutha | G06F 16/162 |
| 9,842,218 B1* | 12/2017 | Brisebois | H04L 63/102 |
| 9,842,220 B1* | 12/2017 | Brisebois | G06F 21/6218 |
| 9,847,994 B1* | 12/2017 | Kelly | H04L 67/06 |
| 9,928,005 B2 | 3/2018 | Sinha | |
| 9,940,377 B1 | 4/2018 | Sait | |
| 9,990,506 B1* | 6/2018 | Brisebois | H04L 63/20 |
| 10,033,702 B2* | 7/2018 | Ford | G06F 16/951 |
| 2004/0064511 A1 | 4/2004 | Abdel-aziz et al. | |
| 2004/0068523 A1 | 4/2004 | Keith et al. | |
| 2005/0044246 A1 | 2/2005 | Kawabata et al. | |
| 2006/0253500 A1 | 11/2006 | Kapur | |
| 2007/0156670 A1* | 7/2007 | Lim | G06F 21/6218 |
| 2008/0059474 A1* | 3/2008 | Lim | G06F 17/3089 |
| 2008/0208963 A1 | 8/2008 | Eyal et al. | |
| 2008/0222108 A1* | 9/2008 | Prahlad | G06F 17/30616 |
| 2010/0081417 A1* | 4/2010 | Hickie | G06F 21/604 |
| | | | 455/414.1 |
| 2010/0269158 A1 | 10/2010 | Ehler et al. | |
| 2011/0093471 A1* | 4/2011 | Brockway | G06F 17/30616 |
| | | | 707/747 |
| 2013/0066833 A1* | 3/2013 | Aikas | G06F 16/21 |
| | | | 707/634 |
| 2013/0139191 A1 | 5/2013 | Ren | |
| 2013/0155068 A1 | 6/2013 | Bier et al. | |
| 2013/0225284 A1 | 8/2013 | Lenger | |
| 2013/0229429 A1 | 9/2013 | Mi et al. | |
| 2014/0114940 A1 | 4/2014 | Prahlad et al. | |
| 2014/0279893 A1 | 9/2014 | Branton | |
| 2015/0032686 A1 | 1/2015 | Kuchoor | |
| 2015/0089514 A1 | 3/2015 | Grewal et al. | |
| 2015/0124820 A1 | 5/2015 | Alizadeh attar et al. | |
| 2015/0149898 A1 | 5/2015 | Worrall et al. | |
| 2015/0156263 A1 | 6/2015 | Clayton et al. | |
| 2015/0163206 A1* | 6/2015 | McCarthy | G06F 21/6227 |
| | | | 713/171 |
| 2015/0169716 A1 | 6/2015 | Franklin et al. | |
| 2015/0186492 A1 | 7/2015 | Shalita et al. | |
| 2015/0186668 A1 | 7/2015 | Whaley et al. | |
| 2015/0200948 A1* | 7/2015 | Cairns | G06F 21/44 |
| | | | 726/4 |
| 2015/0215390 A1 | 7/2015 | Yerli | |
| 2015/0242466 A1 | 8/2015 | Alexander et al. | |
| 2015/0294377 A1* | 10/2015 | Chow | G06Q 30/0263 |
| | | | 705/347 |
| 2015/0301903 A1* | 10/2015 | Mutha | G06F 11/1453 |
| | | | 707/692 |
| 2015/0363270 A1* | 12/2015 | Hammer | G06F 16/00 |
| | | | 711/162 |
| 2016/0019224 A1* | 1/2016 | Ahn | G06F 16/164 |
| | | | 707/671 |
| 2016/0021037 A1* | 1/2016 | Hewitt | H04L 51/046 |
| | | | 715/752 |
| 2016/0026704 A1 | 1/2016 | Strong et al. | |
| 2016/0055248 A1 | 2/2016 | Goel et al. | |
| 2016/0078245 A1* | 3/2016 | Amarendran | G06F 16/164 |
| | | | 713/193 |
| 2016/0188591 A1 | 6/2016 | Bestler et al. | |
| 2016/0188599 A1 | 6/2016 | Maarek et al. | |
| 2016/0191509 A1 | 6/2016 | Bestler et al. | |
| 2016/0191618 A1 | 6/2016 | Shi | |
| 2016/0210202 A1 | 7/2016 | Sinha | |
| 2016/0283085 A1 | 9/2016 | Beausoleil et al. | |
| 2016/0300141 A1 | 10/2016 | Veeraragavan et al. | |
| 2016/0359856 A1 | 12/2016 | Wang et al. | |
| 2017/0006020 A1* | 1/2017 | Falodiya | H04L 63/0815 |
| 2017/0039145 A1* | 2/2017 | Wu | G06F 12/0813 |
| 2017/0041296 A1* | 2/2017 | Ford | G06F 16/951 |
| 2017/0048222 A1 | 2/2017 | Wise | |
| 2017/0060918 A1* | 3/2017 | Iyer | G06F 21/6218 |
| 2017/0131912 A1 | 5/2017 | Sinha | |
| 2017/0142094 A1* | 5/2017 | Doitch | H04L 63/0807 |
| 2017/0228387 A1* | 8/2017 | Ahn | G06F 16/125 |
| 2017/0250816 A1* | 8/2017 | Popa | H04L 9/3247 |
| 2018/0047072 A1* | 2/2018 | Chow | G06Q 30/0263 |
| 2018/0081887 A1* | 3/2018 | Ahn | G06F 16/164 |
| 2018/0107838 A1* | 4/2018 | Amarendran | G06F 21/6245 |
| 2018/0173372 A1 | 6/2018 | Greenspan et al. | |
| 2018/0181314 A1* | 6/2018 | Dhuse | G06F 3/067 |
| 2018/0203770 A1 | 7/2018 | Tennoe et al. | |
| 2018/0203869 A1 | 7/2018 | Henriques et al. | |
| 2018/0205792 A1 | 7/2018 | Macksood et al. | |
| 2018/0219687 A1* | 8/2018 | Popa | H04L 9/3247 |

OTHER PUBLICATIONS

"Knowledge Center—Extending Kaltura—Programming Using API and Plugins", http://kaltura100.rssing.com/chan-36499864/all_p1.html, Published on: Oct. 17, 2013, 54 pages.

"Easily Allow a User to Access another User's Mailbox", https://technet.microsoft.com/en-us/library/ff381460.aspx, Retrieved on: Jan. 1, 2017, 2 pages.

Dubey, et al., "Weaver: A HighPerformance, Transactional Graph Database Based on Refinable Timestamps", In Proceedings of the VLDB Endowment, vol. 9, No. 11, Jul. 2016, 12 pages.

Raykova, et al., "Privacy Enhanced Access Control for Outsourced Data Sharing", In Proceedings of 16th International Conference on Financial Cryptography and Data Security, Feb. 27, 2012, pp. 1-15.

Grolinger, et al., "Data management in cloud environments: NoSQL and NewSQL data stores", In Journal of Cloud Computing: Advances, Systems and Applications, vol. 2, Issue 1, Dec. 2013, pp. 1-24.

Lamos, et al., "Azure AD token reference", https://docs.microsoft.com/en-us/azure/active-directory/active-directory-token-and-claims, Published on: Jun. 10, 2016, 15 pages.

Lamos, et al., "Azure Active Directory developer's guide", https://docs.microsoft.com/en-us/azure/active-directory/active-directory-developers-guide, Published on: Sep. 12, 2016, 7 pages.

"Microsoft Azure", https://docs.microsoft.com/en-us/azure/, Retrieved on: Jan. 1, 2017, 3 pages.

"App authentication with Microsoft Graph", https://graph.microsoft.io/en-us/docs/authorization/auth_overview, Retrieved on: Jan. 1, 2017, 4 pages.

"Microsoft Graph permission scopes", https://graph.microsoft.io/en-us/docs/authorization/permission_scopes, Retrieved on: Jan. 1, 2017, 10 pages.

Altimore, et al., "Quickstart for the Azure AD Graph API", https://docs.microsoft.com/en-us/azure/active-directory/active-directory-graph-api-quickstart, Published on: Sep. 16, 2016, 7 pages.

Hardt, D., "The OAuth 2.0 Authorization Framework", https://tools.ietf.org/html/rfc6749, Published on: Oct. 2012, 76 pages.

Jones, et al., "JSON Web Token (JWT)", http://self-issued.info/docs/draft-ietf-oauth-json-web-token.html, Published on: May 2015, 19 pages.

"Android Pay—A fast, simple way to pay", https://developers.google.com/android-pay/, Retrieved on: Jan. 1, 2017, 2 pages.

(56) References Cited

OTHER PUBLICATIONS

"Javascript Object Signing and Encryption (JOSE)", http://jose.readthedocs.io/en/latest/, Published on: 2014, 6 pages.

Jones, et al., "JSON Web Token (JWT) Profile for OAuth 2.0 Client Authentication and Authorization Grants", https://tools.ietf.org/html/draft-ietf-oauth-jwt-bearer-11, Published on: Oct. 21, 2014, 10 pages.

"Outlook Dev Center—OAuth Sandbox", https://oauthplay.azurewebsites.net/, Retrieved on: Jan. 1, 2017, 3 pages.

"JSON Web Tokens", https://jwt.io/, Retrieved on: Jan. 1, 2017, 7 pages.

"Ldp Overview", https://technet.microsoft.com/en-us/library/cc772839(v=ws.10).aspx, Published on: Mar. 28, 2003, 2 pages.

Bodriagov, et al., "Access Control in Decentralized Online Social Networks: Applying a Policy-hiding Cryptographic Scheme and Evaluating its Performance", In Proceedings of IEEE International Conference on Pervasive Computing and Communications Workshops, Mar. 24, 2014, pp. 622-628.

"International Search Report and Written Opinion Issued in PCT Application No. PCT/US2018/013678", dated Mar. 28, 2018, 13 Pages.

Wang, et al., "Achieving Distributed User Access Control in Sensor Networks", In Journal of Ad Hoc Networks, vol. 10, Issue 3, Jan. 25, 2011, pp. 1-12.

Krishnanunni, "Building a Social Inbox using MongoDB", Retrieved from: http://suyati.com/webinar/social-inbox-mongodb/, Retrieved on: Dec. 27, 2016, 9 Pages.

"Query the Office graph using GQL and SharePoint Online Search REST APis", Retrieved From: https://developer.microsoft.com/en-us/graph/docs/api-reference/beta/resources/social_overview, Retrieved on: Jan. 6, 2017, 12 Pages.

"Non Final Office Action Issued in U.S. Appl. No. 15/409,447", dated Oct. 4, 2018, 11 Pages.

"Non Final Office Action Issued in U.S. Appl. No. 15/409,451", dated Sep. 27, 2018, 15 Pages.

Bronson, et al., "TAO: Facebook's Distributed Data Store for the Social Graph", In Proceedings of the USENIX Annual Technical Conference, Jun. 26, 2013, pp. 49-60.

Ghemawat, et al., "The Google File System", In Proceedings of the 19th ACM SIGOPS Operating Systems review, vol. 37, Issue 5, Oct. 19, 2003, pp. 29-43.

Hoschek, et al., "Data Management in an International Data Grid Project", In Proceedings of the First IEEE/ACM International Workshop on Grid Computing, Dec. 17, 2000, 15 Pages.

Lefferts, Rob, "Today at Connect( )—introducing the Microsoft Graph", Retrieved from: https://web.archive.org/web/20170320072655/https://blogs.office.com/2015/11/18/today-at-connect-introducing-the-microsoft-graph/, Nov. 18, 2015, 5 Pages.

"International Search Report and Written Opinion Issued in PCT Application No. PCT/US2018/013675", dated Mar. 9, 2018, 11 Pages.

"International Search Report and Written Opinion Issued in PCT Application No. PCT/US2018/013677", dated Mar. 16, 2018, 11 Pages.

"International Search Report and Written Opinion Issued in PCT Application No. PCT/US2018/013679", dated Mar. 20, 2018, 10 Pages.

"Final Office Action Issued in U.S. Appl. No. 15/409,451", dated Apr. 25, 2019, 18 Pages.

"Final Office Action Issued in U.S. Appl. No. 15/409,447", dated May 2, 2019, 11 Pages.

"Non-Final Office Action Issued in U.S. Appl. No. 15/409,464", dated Jul. 3, 2019, 23 Pages.

"Notice of Allowance Issued in U.S. Appl. No. 15/409,447", dated Jul. 31, 2019, 8 Pages.

"Examiner Initiated Interview Summary Issued in U.S. Appl. No. 15/409,451", dated Aug. 9, 2019, 1 Page.

\* cited by examiner

SECURITY FOR ACCESSING STORED RESOURCES

BACKGROUND

As the number of users and applications around the world grows, there is an ever increasing need for more and more data storage for storing various resources. These resources may include for example: files such as spreadsheets, word processing documents, slide presentations, images, videos, etc.; stored communication histories such as emails, IM chat history, etc.; user profile information such as contact details, social media profiles, etc.; and/or sites such as websites, document sharing sites, etc. Such resources may originate from a variety of applications installed on the users' terminals and/or hosted online, such as word processing applications, spreadsheet applications, social media applications, file sharing applications, etc.

Online storage has grown in popularity. Using online storage such resources can be stored online on the "cloud", meaning the resources are stored on a server system accessible via the Internet, the server system typically comprising multiple server units implemented in more than one data centre and/or geographic location. Techniques for distributed storage and processing via a network such as the Internet are known in the art.

It is also known for users to make their own resources available to other users, such as those within the same organization (e.g. company). For instance this may allow one or more other users to view the resource, subscribe to updates to the resource, or even modify the resource. In some cases the resource may be access controlled, in that only one or some specified other users (but not all) are allowed access to the resource. In this case the resource may comprise metadata specifying who is permitted access.

SUMMARY

In conventional systems, the system has to read the metadata each and every time the other user accesses the resource in order to check that the other user is indeed permitted to do so. This adds a latency to every access. It would be desirable to address this latency issue but without doing away with the security of a permissions check.

According to one aspect disclosed herein, there is provided a server system comprising a separate storage area for each of a plurality of parties (e.g. users or user groups) including a first party and a second party (e.g. first and second users). The storage area of the first party stores a primary instance of each of one or more respective data resources of the first party (where the primary instance may directly comprise the resource itself or a link to a resource stored elsewhere). Further, at least one or some of the resources are access controlled. The respective primary instance of each of the access-controlled resources includes permissions metadata, which specifies which one or more others of the parties are permitted access to the respective resource. The server system further comprises a manager function arranged to enforce the permissions. The manager function is configured to perform the following operations of.

In response to a request for the second party to access at least one of the resources of the first party, the manager function performs a permission check comprising reading the permissions metadata included in the respective primary instance stored in the first user's storage area, and therefrom determining whether the second party is specified as being permitted access. On condition that the second user is determined to be permitted access according to said permission check, the manager function then establishes a secondary copy of said one of the resources of the first party in the respective storage area of the second party. Further, the manager function is configured so as, once the secondary copy is established in the storage area of the second party, to allow the second party to access the respective resource by means of the secondary copy without undergoing another permission check against the permissions metadata.

Thus by providing each party with his/her own copy of the resource, and performing the security check at write time instead of read time, then this advantageously reduces the number of occasions on which the permissions check needs to be invoked (assuming the resource is read more times than it is written). I.e. the security check only has to be performed when the resource is initially accessed by the second party (or when updated with a change that warrants a further application of the permissions), but not every time the second party wishes to view the resource.

According to another aspect disclosed herein (which may be used in conjunction with or independently of the above aspect), there is provided computer equipment (e.g. a server system) comprising storage storing data items of a first party (e.g. user), and further comprising a manager function for managing access to the data items. Each respective one of the data items comprises a respective data resource of the first party or a link to the resource. Further, at least one or some of the data items are access controlled, wherein each of the access controlled data items further comprises respective metadata comprising a respective permissions list specifying other parties permitted to access the respective data item. The manager function is configured to perform operations as follows. At least when each of the data items is initially stored in said storage, the manager function includes in the respective metadata an additional element specifying parties permitted access to the resource with fewer bits than the list. Subsequently, in response to a request from a second party (e.g. second user) to access at least one of the data items, the manager function reads the supplemental element, and, without yet reading the full access control list, determines whether a decision can be made as to permitting the second user access to the resource in question based on the supplementary element of the respective metadata. If not, it resorts to reading the full list to determine whether the second party is specified therein. The manager function then grants or denies the second party access to said one of the resources in accordance with said determining operations.

I.e. the manager function uses some other smaller but imperfect piece of information other than the full access control list to try to make a decision about permission, which might be determinative or might not; if so, it has saved some latency, but if not it resorts to the full list.

For instance, in embodiments said additional element may comprises a reduced representation of the list (in which case the manager generates the reduced metadata from the list when the respective data item is initially stored in said storage or when it is modified with a change to the list), wherein the reduced representation consists of fewer bits than the list, but is also not infallibly determinative as to which parties are permitted access to the respective resource. In this case the first of the two determining steps comprises determining whether the second party can be excluded as not permitted access based on the reduced representation. If so, the manager function denies the second party access to said one of the data items. Only if the second party cannot be excluded based on the reduced representation, the manager reads the full list to determine whether the second party is identified therein. If so it grants the second party access to said one of the resources, but otherwise it denies access.

An example for implementing the reduced size representation is a Bloom filter. A Bloom filter is a data structure which represents a set in a manner which, when using it to check whether a candidate is a member of the set, never gives any false negatives but might give false positives.

By reading only the reduced representation or other such supplementary element, this requires only a relatively small amount of data to be fetched. If it can be identified based on this that the user in question is not permitted access, then the access check can be quickly dismissed without incurring the latency of reading the full access control list. If on the other hand the reduced amount of information does not allow the access request to be dismissed, the manager still has to resort to reading the whole access list. But on average over multiple access requests, the latency will be improved.

Similar techniques can be performed using a hash of the list, or a part of the list specifying only permitted user groups rather than individual users. These will be discussed in more detail by way of example later.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
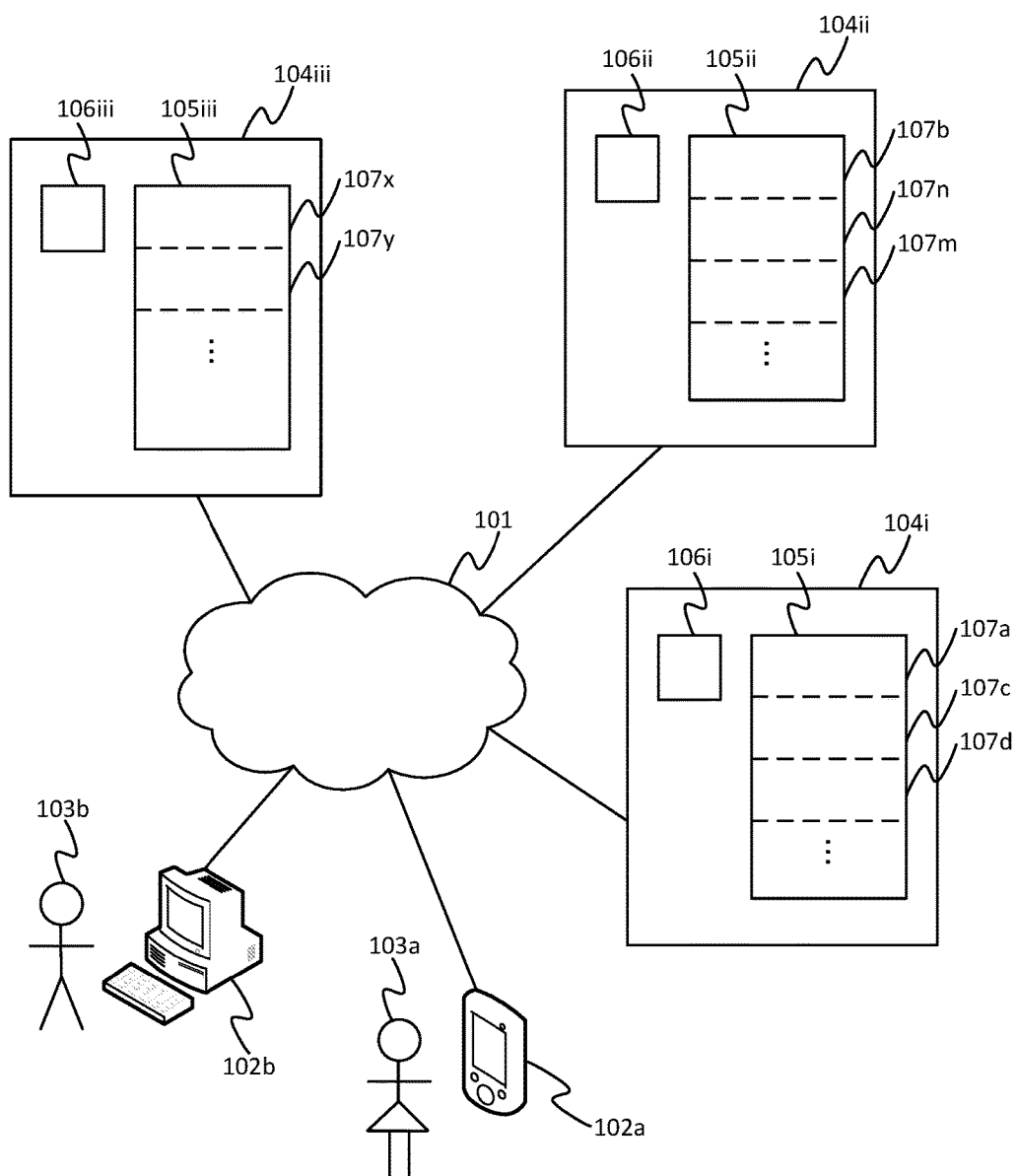
FIG. 1 is a schematic block diagram of a storage system.

FIG. 1 shows a server system in accordance with embodiments of the present disclosure. The server system comprises a plurality of server units 104, each for example being a distinct module (separate casing) on a server rack, or being located in a different room or data centre. Some or all of the server units 104 may even be located at different geographic locations, including the possibility of different towns, cities, counties, states, countries or even continents. Each server unit comprises a respective memory 105 formed of one or more memory devices, which may comprise for example one or more magnetic memory devices such as one or more hard drives and/or one or more electronic memory devices such as one or more solid state drives (SSD), or a combination of any such memory devices. By way of illustration only three server units 104$i$, 104$ii$, 104$iii$ and their respective memories 105$i$, 105$ii$, 105$iii$ are shown in FIG. 1, but it will be appreciated that many more may in fact be included in the system.

The server units 104 are networked together via a suitable packet-switched network 101, e.g. a wide-area internetwork such as that commonly referred to as the Internet, or a private intranet. Network may be implemented by any suitable wired and or wireless communication medium or media, e.g. the wired infrastructure of the internet, and/or one or more wireless networks such as a wireless cellular network, wireless local area network(s), etc. By whatever means implemented, the network 101 enables the server units 104 to act together to provide a distributed storage system accessible to users 103 from their respective user terminals 102 via the network 101. Each user terminal 102 may take any suitable for accessing the network 101 via a wired or wireless connection, e.g. a desktop computer, laptop computer, tablet, smartphone, smartwatch or a pair of smart-glasses (and the different user terminals do not all have to take the same form). Two particular users 103$a$ (a first user, Alice) and 103$b$ (a second user, Bob) and their respective user terminals 102$a$, 102$b$ are shown in FIG. 1 by way of illustration, but again it will be appreciated that the system may serve many more users 103 who access the system from many respective user terminals 102.

By way of example, the server system may be arranged to provide storage services to a plurality of organizations being customers or "tenants" of the provider of the system.

Figure 4:
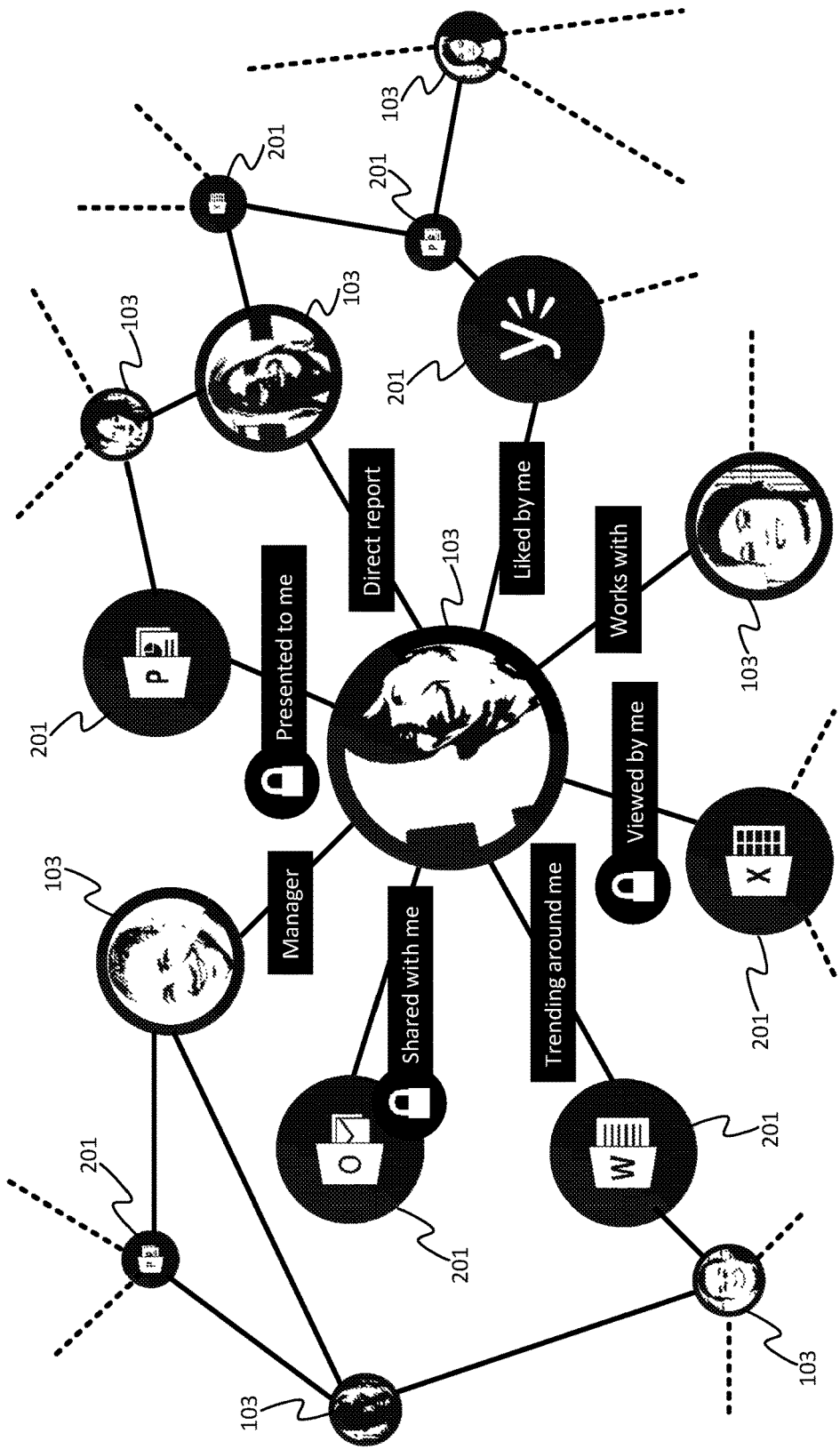

Referring also to FIG. 4, the server system stores data resources 201, where each data resources may comprise any item or collection of digital information, e.g. a file, a stored communication, user profile information, or a site of some kind. Examples of files include word processing documents, spreadsheets, slide decks, images, videos, etc. Examples of stored communications include emails, or IM (instant messaging) chat histories. Examples of user profile information include contact details (e.g. "contact cards") and social media profiles. Examples of sites include document sharing sites, websites, and collaborative sites. Anywhere where a resource is referred to herein, this may refer to any of the above-mentioned resources or others (and the different resources need not all by of the same type).

The memories 105 of the server units 104 store the resources 201 (e.g. files, emails, etc.) of the various users 103, wherein the users can make these stored resources available to others of the users within the organization to enable them perform a certain activity or activities, such as to view or modify the resources to which they have access. Where a user has access to a certain resource, the user may be described as having relationship with that resource, wherein the relationship may be qualified in terms of what activity the user is permitted to perform (e.g. view, modify) and/or the means by which the user came into contact with the resource (e.g. shared with the user, trending around the user, etc.). The server system maintains a graph of all the relationships between users and resources in the organization. The graph also records the qualities of the relationships, i.e. the manner in which the user is related to the resource (viewed by the user, modified by the user, shared with the user, trending around the user, etc.).

The graph is maintained by a manager function 106. In accordance with embodiments disclosed herein, the manager function 106 is implemented in the form of a distributed function, i.e. with a respective instance of the manager function 106$i$, 106$ii$, 106$iii$ running on each of the server units 104$i$, 104$ii$, 104$iii$. Each instance of the manager function 106 takes the form of software stored on part of the memory 105 of the respective server unit 104 and arranged to run on a respective processing apparatus (not shown) of the respective server unit 104 (the processing apparatus comprising one or more microprocessors each with one or more cores). Note also that the possibility of a centralized manager function is not excluded.

Figure 3:
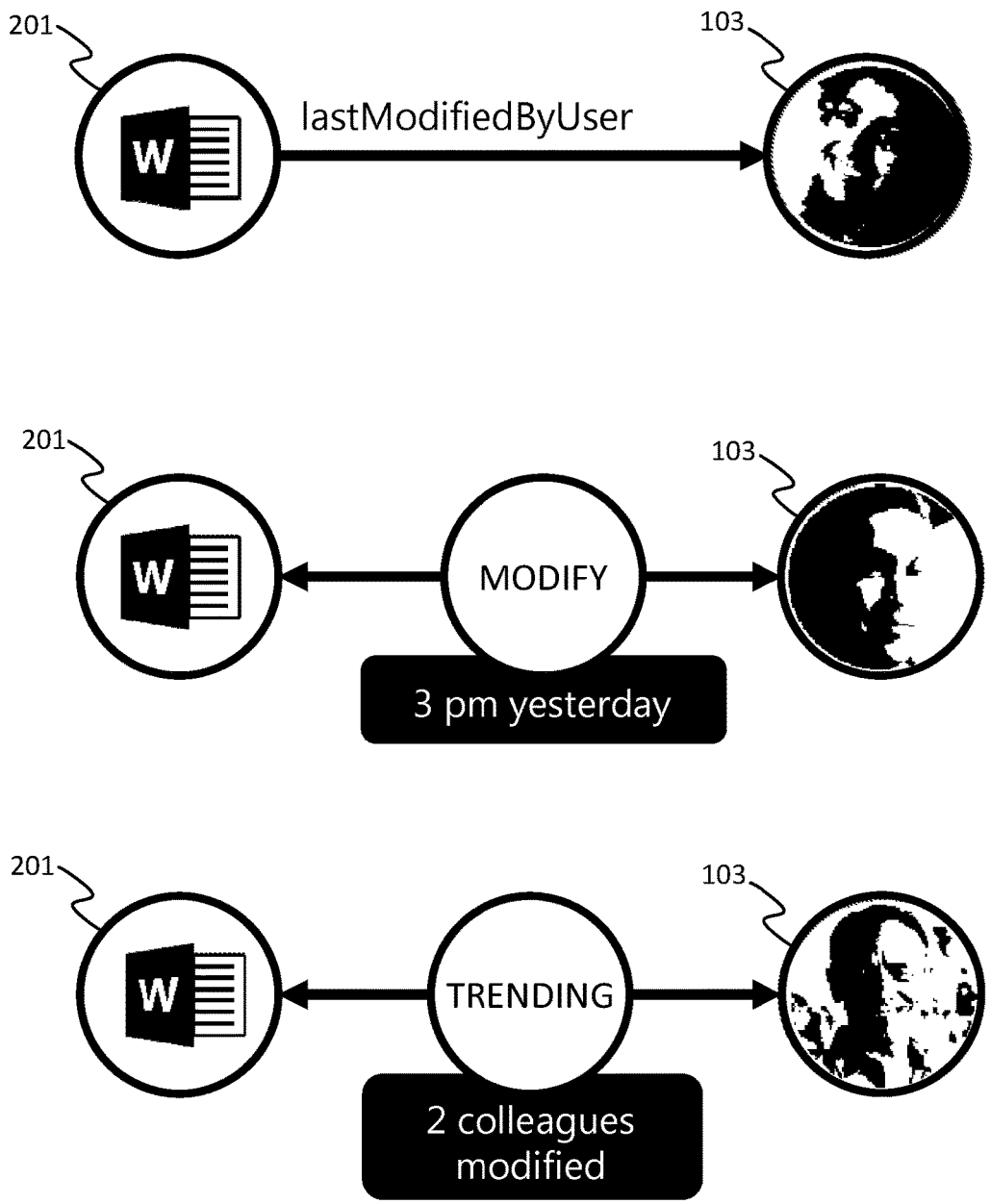
FIG. 3 is a schematic illustration of example relationships between a user and a resource, FIG. 4 schematically illustrates a graph of relationships between users and resources, and FIG. 5 schematically illustrations a partitioning of the graph of FIG. 4, and FIG. 6 schematically illustrates a primary copy of a resource including metadata.

Some examples of graph relationships are illustrated schematically in FIG. 3. The top diagram in FIG. 3 illustrates an example of a basic relationship, which is a direct navigation from one object to another. That is, the relationship defines how a user 103 is related to the resource 201 in question, for instance an action the user 103 has performed in relation to the resource 201 (e.g. the fact that the resource was last modified by that user), and/or the manner in which the user 103 has come into contact with the resource 201 (e.g. shared with the user by another user). Another example of such a relationship is when the user 103 has subscribed to a given resource 201. In this case the user 103 registers with the manager function 106 to receive a notification whenever the specified resource 201 is updated by another user, and the manager function 106 automatically provides the notification when such an update occurs.

The middle diagram in FIG. 3 shows and example of a rich relationship. A rich relationship is one supplemented by metadata, and can connect to one or more objects. The metadata may for example define a time at which the user 103 performed a certain action (activity) in relation to the resource 201, such as the time at which it was last modified by that user.

The bottom diagram in FIG. 3 shows an example of an "insight". An insight is an inferred rich relationship created automatically by an intelligence layer of the manager function 106. An example of an inferred relationship is trending. Trending occurs when beyond a threshold number of predefined actions are detected by the manager function 106 to have been performed in relation to a given resource 201 by one or more predefined other users associated with the user 103 in question. For instance the predefined users may be the contacts of the target user 103, or users in a same group such as the same department within the organization or the same interest group. So for example, if a given resource 201 (e.g. file) has been viewed more than X times by the user's contacts or other users in a certain specified group, the resource will be declared as trending around that user.

All such information is maintained in the graph by the manager function 106, being updated when relationships are created or changed.

If the graph was to be implemented as a single organization-wide graph, then to scale a large system with many users, the graph could only grow by adding more powerful hardware, such as more powerful CPUs, more RAM etc. The presently-disclosed system provides a solution to this by instead partitioning and partially replicating portions of the graph across many per-user mailboxes, thus allowing the graph size to be scaled by adding further server units instead of upgrading the computing power of a given unit.

The graph is conceptually a global interconnected graph across an organization ("tenancy"). However, in accordance with the presently disclosed techniques it is also divided into personal, user site specific graphs with personalized views.

Referring again to FIG. 1, each of the users 103 is allocated his/her own home partition 107, or "shard", in the memory of one or the server units 104. This partition comprises a personal mailbox of the respective user. Further, the graph is divided into a personal view 501 of the graph for each user 103 (see FIG. 5), and this fragment of the graph along with the resources 201 to which the respective user 103 is related via this fragment 501 of the graph are stored in the respective mailbox 107 of that user. Where two users are related to the same resource 201, the resource is copied into the mailbox of one of the users. The primary copy of the resource 201 is stored in the mailbox of the user that owns the data, and a secondary copy is stored in the mailbox of each other user 103 having a relationship in the graph with the resource 201.

Figure 5:
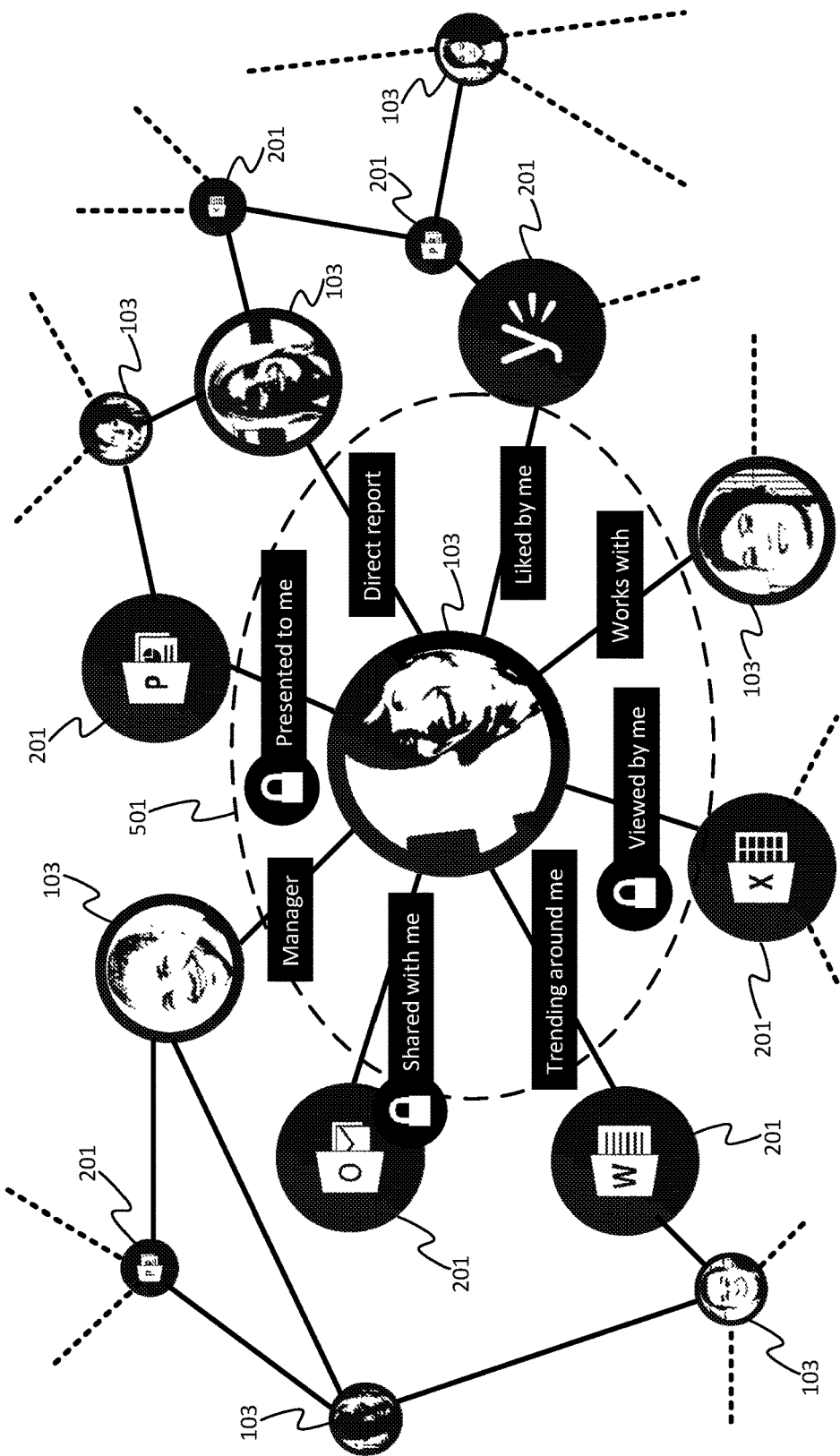

Thus, a tenant-wide graph such as that shown in FIG. 4, showing lots of users, files, other items and the user's actions on the objects, is split into mailboxes ("shards") as represented in FIG. 5.

Each of the mailboxes 107 is implemented on a physically separate respective region of memory. The mailboxes 107a, 107b of any two given users 102a, 102b may be implemented in the memories 105i, 105ii of different server units 104i, 104ii, which may be in different separately removable and replaceable physical modules in the same data centre, or different data centres, or even different geographical regions such as different towns, cities, counties, states or countries or even continents. The various server units 104 are networked together via the network 101 and controlled by the distributed manager function 106 in order to work together to provide the functionality described herein. Sometimes, the mailboxes of any two given users may happen be found in different physical regions of the memory 105 of the same server unit, but the mailboxes are still kept with distinct views 501 of the graph and distinct copies of the respective resources 201 in distinct areas of memory.

Wherever the mailboxes 107a, 107b are implemented, the manager function 106 is configured to establish a respective copy of any resource (file, email, etc.) that is common (within the graph) to more than one user 103 in each of the users' mailboxes 107.

The copy in the mailbox of the user that owns the resource is deemed the primary copy, or synonymously the "master" copy. The owner may for example be the author of the resource or the user that first introduced the resource into the system. In embodiments the manager function 106 is configured with a set of one or more ownership rules for defining who is the owner of a given resource 201 and where the master (i.e. primary) instance of each resources is to be stored (i.e. which user's mailbox 107 or "shard"). Examples of these ownership rules will be discussed in more detail shortly.

The copy in any other user's mailbox 107 is deemed a secondary copy. When any such other user wishes to access the resource such as to view the resource, they view the copy in their own mailbox 107. If there is any subsequent modification to the resource, the modification is made to the primary copy and the manager 106 is configured to then automatically propagate the modification to each secondary copy connected to the primary copy of the graph.

In contrast with the present disclosure, in conventional systems there would be only one single master instance of any given resource, whereby, if made available to other users, all users would access that same single master copy. This would suffer from the scalability issue similar to that described above. However, with a respective fragment 501 of the graph and copies of the respective resources 201 replicated across separate mailboxes 107 of each respective user 103, then each of the mailboxes can be implemented on any server unit an moved between server units 104 in a modular fashion. Hence to expand the system to accommodate more connections in the graph, the provider can simply add more server units 104 and redistribute the mailboxes 107 of different users 103 between server units 104 as necessary.

Preferably the mailbox 107 of a given user 103 is located on a server unit 104 that is located in a same geographic region as that respective user 103. If the manager function 106 is informed or detects (e.g. from persistent use of a new IP address) that the user 103 has moved home to a new geographic location, it may migrate the mailbox 107 to a new geographic location within that new geographic region accordingly. This can be readily effected because the mailboxes 107 are all modular in fashion.

Each copy in each mailbox may also comprise metadata (i.e. a "tag" or label) recording one or more properties of the resource, e.g. qualifying the relationship between the respective user and the resource, and/or some absolute property of the resource such as the last time it was modified by any user. Metadata qualifying the relationship is stored as a property on the direct object of the relationship. When the secondary copy is created, some (but not necessarily all) of the metadata from the primary copy may be duplicated in the secondary copy; and when the primary copy is modified, some (but not necessarily all) of any corresponding changes in the metadata may be propagated to the secondary copy/copies. This will be described in more detail shortly with reference to FIG. 2.

The primary copy may comprise a list defining which other users or groups of users are allowed to access the resource. I.e. not all users can necessarily obtain a secondary copy of a given resource 201—the manager function 106 may be configured to consult this list to determine whether a given other user is entitled to be connected to the resource in the graph and obtain a secondary copy in his/her mailbox.

In embodiments, the graph is limited to a given organization (e.g. company), such that user's outside the organization cannot form relationships with, nor gain access to, the resources of users within the organization. This advantageously allows the provider of the server system to provide storage services to multiple organizations without disclosure of potentially sensitive information between organizations. E.g. if the provider provides storage services to two rival cola companies, the companies would want to keep their data firmly secret form one another. However it is not excluded that in other embodiments the graph could span multiple organizations or even be global to all users.

On a point of terminology, note that the term "copy" is used herein in the sense of one of multiple instances of the same document or other such resource. "Primary copy" or "master copy" does not necessarily mean the primary or master instance is a copy in the sense of a duplicate or reproduction from some other original. The master/primary copy could be the original instance, or could be originated from an original instance stored elsewhere (not part of the graph system) such that the master copy is the master within the graph but not the ultimate original copy, and could e.g. contain just extracted text or other content from the original instance, or could include a link to the content of the original instance. "Secondary" however does mean that the secondary copy is generated from the master (primary copy).

Note also, while embodiments are described herein in terms of individual users 103, one, some or all of the mailboxes (and the copies of the resources 201 and fragment of the graph 501 stored therein) could in fact be that of a particular group of users such as a team within an organization. Hence group data such as group conversations, collaborative documents or collaborative work sites may be stored in group mailboxes, and such group content may be shared with other users or other groups. Wherever a user is referred to in this description, this could more generally be any party consisting of a single user or a defined group of users.

Further, use of the term "mailbox" in the description herein does not mean the resources 201 are limited to being emails or any other form of mail. As discussed above, the resources 201 of which primary and secondary copies are stored in the various users' mailboxes 107 may take any of a variety of forms such as files, communications, sites and/or user profile information.

In embodiments the manager function 106 uses email as the medium by which to send the data from one user's storage area 107 to another's in order to create the secondary copy from the primary copy, and/or as the medium by which to propagate changes in the primary copy to the secondary copy. This does not mean the end-user 103 receives an email, but rather the manager function 106 uses email "behind the scenes". E.g. consider the creation of a secondary copy of a resource into a mailbox 107b of a second user 103b on a second server unit 104ii from a primary copy in a mailbox 107a of a first user 103a on a first server unit 104a, or the propagation of a modification from the primary to the secondary copy. The instance of the manager function 106i on the first server unit 104i sends an email to the instance 106ii on the second server unit 104ii, the email containing the data for making the secondary copy or for propagating the change, and the receiving instance 106ii of the manager function intercepts this email and acts upon it, without the email being actually presented as a received email to the end-user 103b of the receiving mailbox 107ii. Hence in embodiments, the graph is partitioned down into email mailboxes to enable it to be implemented through an email platform. The email platform provides a persistent messaging queue for maintaining secondary copies by asynchronous messaging.

However, this is not limiting, and in other embodiments other communication media could be used, e.g. a proprietary protocol for propagating the secondary copies and modifications. For avoidance of doubt, anywhere a mailbox is referred to in the present description, this may equally be replaced with an alternate term such as "storage area", "user area", "storage compartment" or the like. In accordance with terminology introduced herein, this may also be referred to as a "shard".

Regardless of the medium by which changes are propagated, the manager function 106 implements ownership rules for determining where resources 201 are mastered, and rules for establishing and maintaining secondary copies.

The ownership rules define which user 103 is the owner of each given resource 201 and therefore whose mailbox 107 stores the primary copy. In embodiments the disclosed server system, including the manager function 106 and the graph it maintains, are configured to work in conjunction with an underlying file system operated by the provider of the server system, and/or to work in conjunction with a partner file system operated by a third party, or such like. E.g. these could include a cloud storage service, a file sharing service or site, a collaborative document sharing site, etc. Alternatively or additionally, the server system may be configured to work in conjunction with a local file system on each of one or more of the user's user terminals 102. The ownership rules implemented by the manager function 106 by being configured to map resources in the user's local or online file libraries, accounts, and/or sites, etc. onto primary instances in the mailboxes 107 of the user 103, thereby creating a consistent mapping of nodes and relationships in a global graph down to the mailboxes 107 (or more generally storage areas or "shards").

For instance, a given user 103 may have a file library comprising one or more folders stored locally on his/her computer, or on an online cloud storage service. The ownership rules may define that any and all files in that file library, or one or more selected folders within that file library, are to have their primary instance stored in the mailbox 107 of that user 103. Any other user 103 who has access to any of those files will have a secondary copy maintained in his/her mailbox 107. As another example, a given user 103 may have an online file sharing account comprising one or more folders. The rules may define that any and all files in that file sharing account, or one or more selected folders within that file sharing account, are to have their primary instance stored in the mailbox 107 of that user 103. Again any other user 103 who has access to that one of these files will have a secondary copy maintained in his/her mailbox 107. As another example, a given user 103 may have an account on an online collaborate workspace of site comprising one or more folders, and the rules may define that any and all files in the user's workspace, site or collection of sites, or one or more selected folders within the workspace, site or sites, are owned by that user and therefore have their primary copies in that user's mailbox. Generally such ownership rules may apply to any resource repository, e.g. file library, collection of files, site, site collection, workspace, etc.

Note that where ownership or ownership rules are referred to herein, or such like, this does not necessarily mean the user is the owner in any other sense than he or she is the user having the primary copy stored in his/her mailbox (i.e. storage area) 107. For example it does not necessarily mean the user is the copyright holder. Alternatively for instance, some resources or libraries etc. may be owned in a legal sense by the organization and not to one user. Furthermore, as mentioned, anything described herein in relation to an individual user can also relate to a group of users. Hence for some resources 201, the resource 201 is not owned by an individual user even in the sense of having the primary copy stored in the mailbox of an individual user, but rather may be stored in a mailbox "belonging" to multiple users, e.g. a team within the organization or even the organization as a whole. For these libraries, the system may create "arbitration mailboxes", i.e. mailboxes not owned by any user in particular, and may map each library (at some level) deterministically into one such mailbox.

As well as ownership rules, the manager function 106 also applies one or more further rules for creating and maintaining secondary copies. The ownership rules and/or further rules may be configured to favour performance and/or locality. For locality, the "right" objects are made available locally according to simple rules. For example, according to one preferred rule implemented by the manager function 106, every resource 201 a given user 103 ever accessed is in his/her respective mailbox 107. In embodiments, resources 201 deemed to "trend-around" that user 103 may be included in his/her respective mailbox 107 as well. The trending resources may be generated based on an activity subscription mechanism. For instance, the user gets all activity of the 40 people who he/she works the most with, and when deemed interesting locally, the related items are copied (secondary copies established) in the user's mailbox 107.

Figure 2:
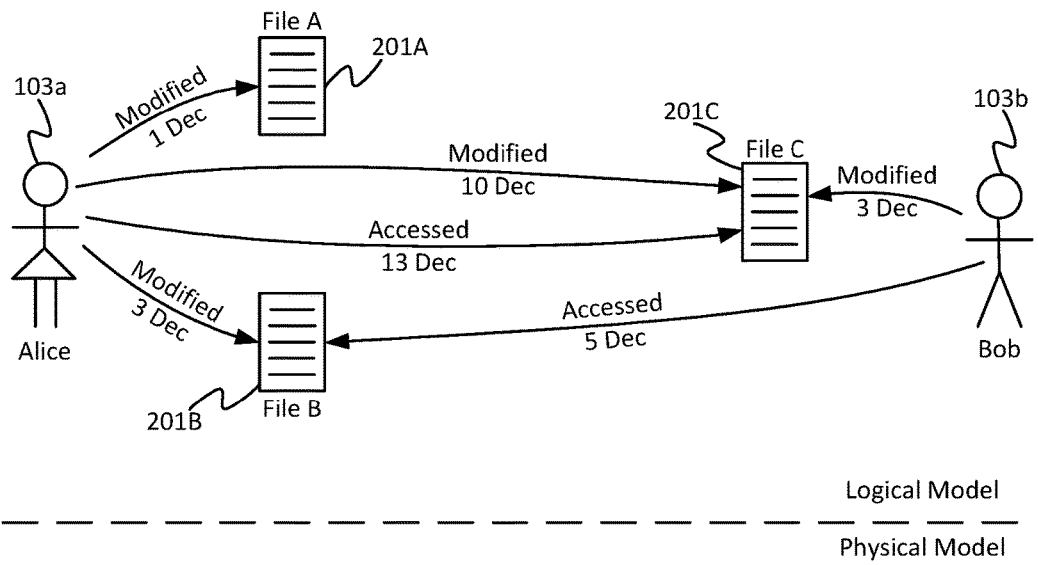
FIG. 2 is a schematic illustration of a logical and physical model of the storage system.
Figure 2:
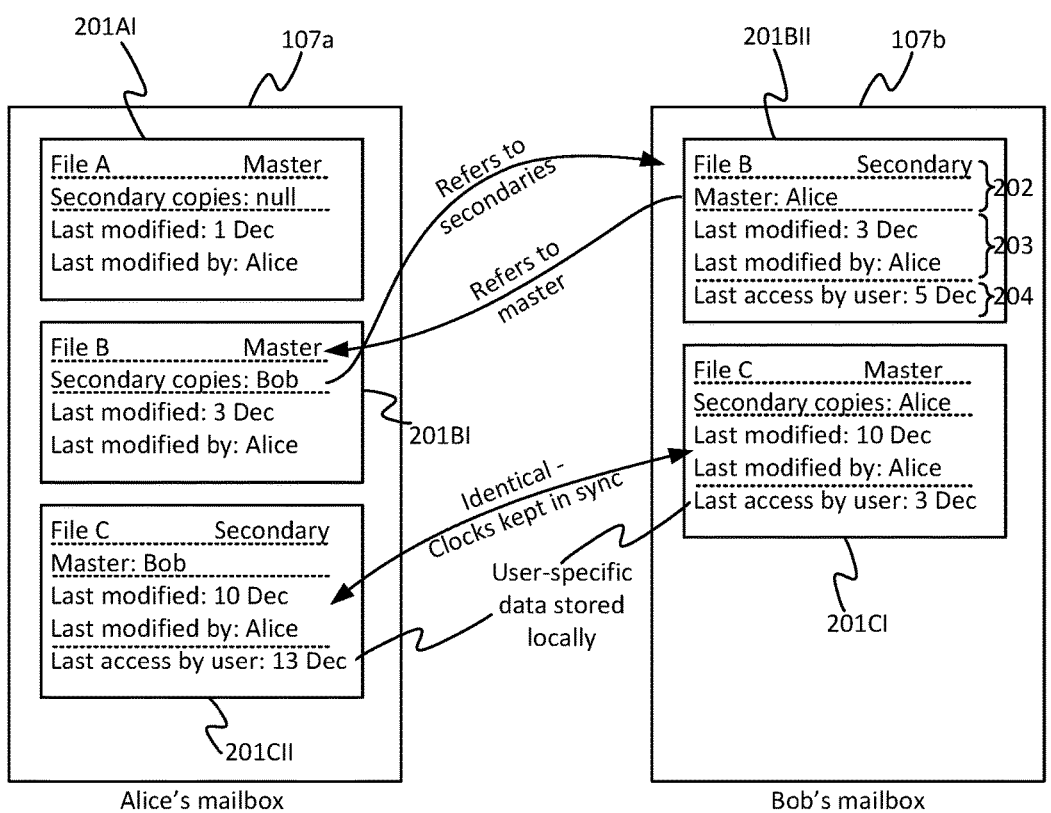

FIG. 2 illustrates a logical model and a physical model of the system, mapping from online storage libraries to mailboxes. The top diagram shows the logical model and the bottom diagram shows the physical model. FIG. 2 also illustrates examples of properties that are shared and synced across mailboxes 107, and by contrast personal properties which are specific to a given user's mailbox.

FIG. 2 illustrates these concepts by reference to an example involving a first user 103a (Alice) having a respective mailbox 107a instantiated on a first of the server units 104i, and a second user (Bob) having a separate respective mailbox 107b which may happen to be instantiated on a second of the server units 104ii. In the example shown there are three resources: a first file 201A ("File A"), a second file 201B ("File B") and a third file 201C ("File C"). It will be appreciated that in practice the mailboxes 107 may in fact store many more resources than this, and that there may also be many a more complex web of many more relationships involving many more users. Also the resources are not limited to files. This particular example of the two users and three files is given only by way of illustration.

File A and File B belong to Alice. Hence the master (primary) copy 201A*l*, 201A*ll* of each of File A and File B are each stored in Alice's mailbox 107a. File C belongs to Bob and hence the master (primary) copy 201C*l* is stored in Bob's mailbox 107b. At some point Alice has had been connected with File B, for example Alice shared File B with Bob, or Bob received a notification about File B as a result of a subscription (e.g. because it was trending, or because Bob has subscribed to all content from Alice, or searched for content from Alice, etc.). In response the manager function 106 automatically creates a secondary copy of File B in Bob's mailbox 107b.

Similarly, at some point Alice has come into contact with File C, Bob's file. Again this could for example be because Bob shared File C with Alice, or because of a subscription that Alice has notifying her of content from Bob, or as a result of a search query, etc. In response, the manager function 106 automatically creates a secondary copy of File C in Alice's mailbox 107a.

Note that in embodiments the system allows another user other than the owner to modify a resource 201, e.g. to make changes to a document despite the fact that he/she is not the author. In this case the other user modifies the primary copy 201*l*, i.e. the owner's copy, and the manager function 106 then propagates the modification back down to the other user's mailbox 107. So if Alice authored or published File B, Bob can edit it, in which case he edits the primary copy 201B in Alice's mailbox 107a, and then the edits are propagated back to his secondary copy on his own mailbox 107b. When Bob views File B however, he views the local, secondary copy from his own mailbox 107b.

In embodiments further, one or both of the primary and secondary copies 201*l*, 201*ll* of any given resource could be absolute copies. That is, the actual data content of the file is stored explicitly (i.e. directly) in the respective mailbox 107 itself (as opposed to being stored in the form of a link). However, an alternative possibility is that one or both of the primary and secondary copies 201*l*, 201*ll* of any given resource could be "shallow" copies. A shallow copy is a copy that is stored in the respective mailbox 107 in the form of a link, linking to the actual data content of the resource stored elsewhere, e.g. externally to the server system (e.g. a third party server). Note therefore that the term "copy" as used herein does not necessarily refer to a full duplication of the actual data content of a resource, and could also refer to a copy stored in the form of a link. In one particular example, one, some or all of the primary copies 201*l* could be stored as absolute copies, and the respective secondary copies could be stored as shallow copies linking to the absolute primary copies. As another example, one some or all of the primary copies themselves could be shallow copies linking to the content of the respective resource as stored elsewhere, such as an online file system. For example the ultimate source to which the primary copy links could be an underlying online cloud file system or file sharing service run by a provider of the server system, or a third-party file sharing or cloud-storage service.

Irrespective of whether the content of the resource 201 is stored in absolute terms or as a shallow copy, each of the primary and secondary copies 201*I*, 201*II* comprises metadata.

The metadata comprises at least a first portion of metadata 202, which may be referred to as connecting metadata. This metadata 202 specifies whether the copy is a primary (i.e. master) copy or a secondary copy, and if it is a primary copy what secondary copies there are (if any), or if it is a secondary copy then which is the primary copy. E.g. the former may be specified in terms of which user(s) 103 have a secondary copy (if any), and the latter may be specified in terms of which user 103 owns the primary copy. This metadata is preferably always stored in absolute terms (i.e. directly/explicitly) on the respective mailbox 107 itself (i.e. not in the form of a link), regardless of whether the content of the resource is stored in absolute terms or shallow form.

The metadata may also comprise common metadata 203 which is common across all primary and secondary instances 201*I*, 201*II* of the same resource 201. An example is the last time or date when the resource 201 was modified by any user, the identity of the last user to modify the resource 201, the title of the resource 201, and/or the file size. This information is the same regardless of whose mailbox 107 the copy is in. Hence this metadata could be stored in absolute terms or shallow form.

Alternatively or additionally, the metadata may comprise personal metadata 204 (personal in the sense that it is specific to a particular user, not necessarily in the sense of being private). An example is the last time or date when the resource 201 was modified by the particular user 103 whose mailbox 107 the particular copy in question is stored in (so the last time modified by Bob in the case of the secondary copy of File B, for instance). Such metadata is specific to the individual user 103 whose mailbox 107 the copy is stored in. Hence this metadata is preferably always stored in absolute terms (i.e. directly/explicitly) on the respective mailbox 107 itself (i.e. not in the form of a link), regardless of whether the content of the resource is stored in absolute terms or shallow form.

The reference numerals for the different portions of metadata 202, 203, 204 are only shown against the secondary copy of File B (201B*II*) in FIG. 2, but it will be understood that similar metadata maybe present in each instance of each file or resource.

As some of the metadata is shared between different instances of the same resource 201, whereas some is specific to the particular copy 201*I*, 201*II*, then the manager function is configured to treat the two different categories of metadata differently when establishing a secondary copy 201*II*, and also to treat the two different categories of metadata differently when propagating modifications from the primary copy 201*I* to the secondary copies 201*II*.

That is, when the manager function 106 makes a copy of the primary copy 201*I* of a resource 201 from the owner's mailbox 107, copied into the mailbox of the other user(s) 103, then the manager function copies over only the common metadata 203, i.e. the metadata that is common across different instances 201*I*, 201*II* of a given resource 201. The connecting metadata 202 and the personal metadata 204 will be specific to the particular secondary copy 201*II*, and hence the manager function 106 will instead create dedicated values of these metadata element for the particular secondary copy 201*II* currently being created.

Furthermore, when the manager function 106 propagates a modification of the primary copy 201*I* of a resource 201 from the owner's mailbox 107, being propagated to the mailbox(es) 107 of the other user(s) 103, then the manager function 106 propagates only the modification to the common metadata 203, i.e. again the metadata that is common across different instances 201*I*, 201*II* of a given resource 201. As the connecting metadata 202 and the personal metadata 204 are specific to each particular secondary copy 201*II*, the manager function 106 will not overwrite the values of these metadata values in secondary copies 201*II* when propagating changes.

By way of example, consider File B shown in FIG. 2, of which Alice is the owner and Bob has a secondary copy 201B*II*. The metadata 203 indicating when the resource was last modified (globally) is common to both the primary copy 201B*I* and the secondary copy 201B*II*. When File B is modified (e.g. by Alice), on 3 December, this new value of this common data is propagated through the graph to all secondary copies including Bob's secondary copy 201B*II*. On the other hand, the metadata 204 indicating when the resource was last accessed specifically by Alice is locally relevant only to Alice's own mailbox 107*a*, and the corresponding value of that metadata 204 indicating specifically when Bob last accessed the resource is relevant only to Bob's own mailbox 107*b*. Hence when File B is modified, e.g. by Alice, this change is not propagated through to Bob's mailbox 107*b*. Or if Bob modifies File B, the personal last-modified value is not modified in Alice's personal metadata 204 on the primary copy.

When storing a relationship between a user (actor) and a document (direct object), the manager function stores that relationship as part of the document in the actor's shard. Thus there is provided an "in-lined" storage of relationships on the direct object. The actor is the actor of the relationship, and the user whose copy the relationship is stored in.

For instance the set of possible relationships may comprise one or more of: AccessAction (the actor has viewed the document), ModifyAction (the actor has edited the document), LastAccessed (the time and/or date the resource was last accessed by the actor), LastModified (the time and/or date the document was last modified by the actor), TrendingAroundWeight (the document trends around the actor with a certain weight), and/or ReuseWeight (the likelihood of the user to reuse part of the document).

The time or date on which a resource 201 was last accessed or last modified by a given user 103 is an example of a rich relationship, i.e. the record of the relationship in-lined in the metadata comprises at least one parameter qualifying the action (in this case the date on which the action was performed).

TrendingAroundWeight and ReUseWeight are examples of inferred relationships. The trending weight is a score which quantifies how much a given resource is trending around a given user, e.g. Alice. The manager function 106 is arranged to detect this based on signals from people working closely around Alice who are viewing and/or modifying the resources. The people from whom signals are taken to determine whether a resource 201 is trending "around" a certain user 103 may be a specific subgroup of other users, e.g. a list of contacts, colleagues or friends. The re-use weight is a measure of how likely resource 201 (e.g. document) is to be cited in another resource. The manager function 106 can detect this based on its visibility of the other resources in the system.

The manager function 106 is configured to accept a search query from any of the user terminals 102, each search query including at least one search criterion. The search criterion or criteria may for example specify a certain searched for value or range of values for one or more elements of the metadata 202, 203, 204.

For instance, according to embodiments disclosed herein, the manager function 106 may be configured to accept a value or range for one or more of the elements of personal metadata 204 as a search criterion or criteria. E.g. Alice wishes to search for a certain document. As a search criterion she may search for all documents that were last accessed by her (specifically by her, not just any user) on a certain specified date or within a certain specified date range. In response, the manager function 106 returns all the resources 201 accessed by Alice on the date, or within the date rate, specified in the personal metadata 204. A similar search could be performed based on the last modified date.

Also, the search need not be performed by Alice herself. Rather, a user could search for resources 201 based on the personal metadata of another user. So e.g. Bob could search for all documents accessed or modified by Alice on a certain date or in a certain date range, or vice versa.

As another example of using personal metadata 204 for searching, the search may be based on an inferred relationship. For instance Alice may search for all resources 201 trending around her, or another user may search for all resources 201 trending around Alice.

The above has described a system that allows resources such as files belonging to one user 103a to be accessed by another user 103b. However, not all resources are necessarily allowed by the owner to be shared, or not necessarily with all other users 103. In embodiments, some resources may be private (not available made available to be accessed by anyone else), some resources may be public (allowed to be accessed by anyone), and some resources may be access-controlled (i.e. only made available to a specified one or more other users and/or groups of users, but not all other users).

Figure 6:
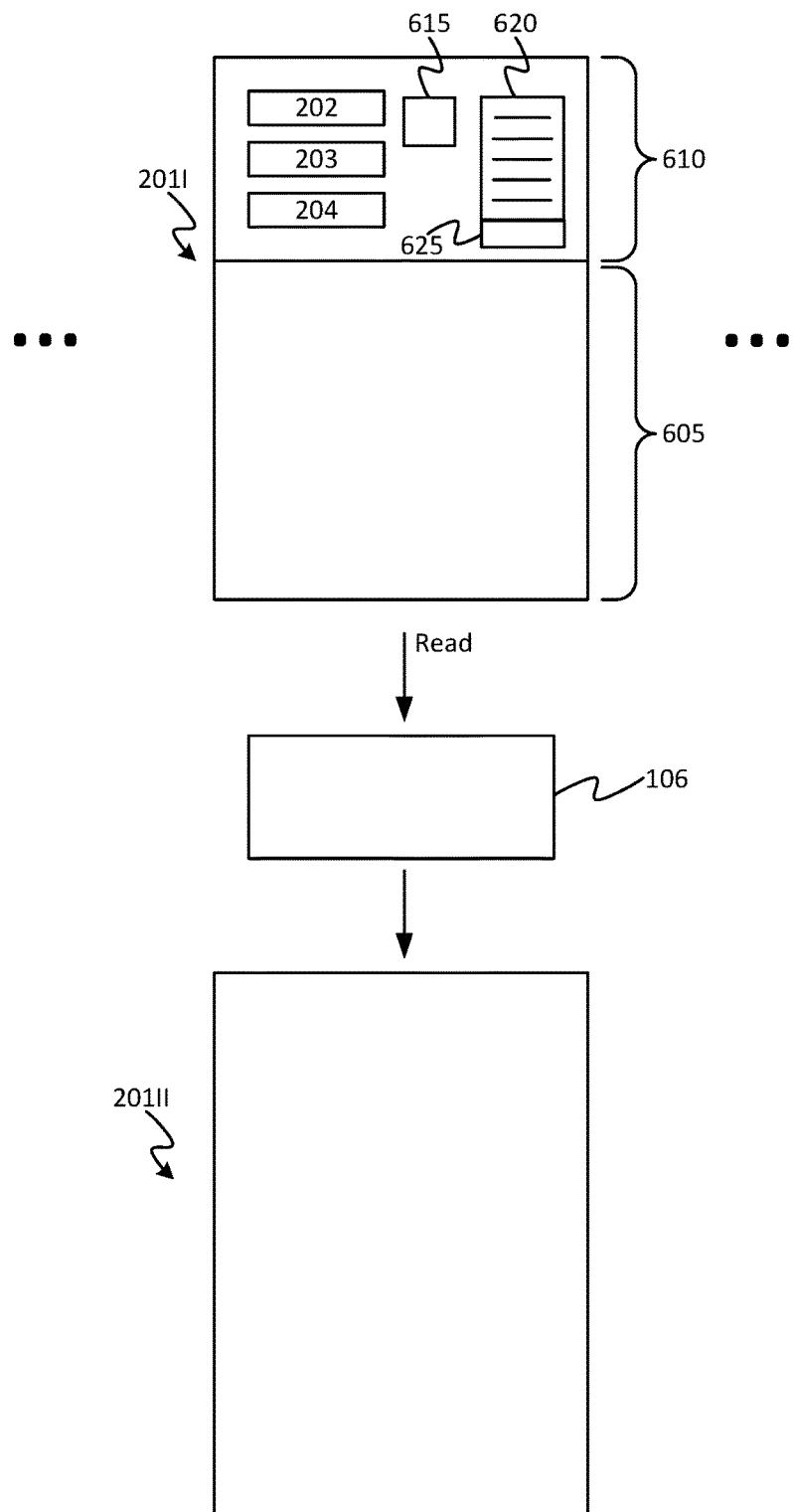

As illustrated in FIG. 6, this access policy may be specified in the metadata of the primary copy 201l respective resource 201. As shown, the primary instance 201l stored in the mailbox (or storage area) 107 of a given user 103 comprises a body portion 605 and metadata 610. The body portion 605 comprises the content of the resource (if the primary copy is an absolute instance of the resource stored in the) or a link to the content of the resource (if it is a shallow copy). The metadata 610 may comprise the metadata elements 202, 203, 204 already discussed above. Further, the metadata 610 may comprises a field 615 specifying the access policy of the resource 201, i.e. whether it is public, private or access-controlled. If the resource is access controlled, the metadata 610 also comprises an access control list (ACL) 620. This is a list specifying which one or more parties are permitted access to the respective resource 201. For instance this/these parties may be selected by the first user 103a (i.e. owner of the resource) him/herself though a suitable user interface to the control function, e.g. a settings menu or the like.

The access control list 620 may specify who is permitted access in terms of a list of individual users who are permitted access, and/or a list of one or more user groups that are permitted access. The users and/or user groups may be specified in the list 620 by means of a user ID or group ID, respectively, from amongst a scheme of IDs used to identify users and/or groups within the server system in question. E.g. the scheme of IDs could be usernames, email addresses, a proprietary scheme of numerical IDs, or network addresses.

The manager function 106 is configured to enforce the access policy for each resource 201 based on the permissions metadata 615, 620. To do this, when the manager function 106 receives a request from a second user 103b requesting access to a resource of a first user 103a (or receives such a request from an application used by the second user 103b requesting access on behalf of the second user 103b), then in response the manager function 106 reads the permissions fields 615, 620 of the metadata stored in the primary copy 201l of the resource in question in the first user's mailbox (or storage area) 107a. Thus the manager function 106 determines whether the resource is public, private or access controlled, and if access controlled, who is specified as being allowed access in the access control list 620.

If the policy field 615 specifies that the access policy is public, the manager function 106 allows the second user 103b access to the resource unconditionally, and establishes the secondary copy 201ll in the mailbox (or storage area) 107b of the second user 103b. If on the other hand the policy field 615 specifies that the access policy is private, the manager function 106 blocks the second user 103b from accessing the resource unconditionally, and does not establish the secondary copy 201ll in the mailbox 107 of the second user 103b.

However, if the policy field 615 specifies the third category of access policy, i.e. access-controlled, then it bases the decision as to whether grant access on the access control list (ACL) 620. The request from the second user 103b (or the application he/she is using) includes a user ID of the individual user or a group ID of a group the second user 103b belongs to (e.g. a certain team within the organization, or a set of people of a certain seniority level or having a certain security clearance). The manager function 106 obtains this ID from the request. Preferably the manager function 106 performs an authentication process to authenticate that the identity of the user asserted in the received ID (i.e. the request really does originate from or on behalf of the second user 103b). Authentication processes in themselves are familiar to a person skilled in the art.

Further, assuming the identity is indeed authentic, the manager function 106 determines whether the user or user group identified in the request is entitled to access the resource in question according to the access control list 620. To do this, the manager function 106 compares the received ID against the IDs in the access control list 620. If the ID is found in the list, the manager function grants the second user 103b access and creates a secondary copy 201ll in the mailbox (or storage area) 107b of the second user 103b; but otherwise it does not.

Once the secondary copy is established in the mailbox or other such storage area 107b of the second user 103b, the second user 103b can then subsequently and repeatedly access the resource 201 in question by accessing the secondary copy 201ll, at least to view the resource. The manager function 106 does not reapply the security check (i.e. permissions check) each time. The permission check is only re-applied if the primary instance is deleted, or the access control list 620 is modified, or if there is some other modification to the primary instance that warrants refreshing the permissions check.

Thus the disclosed mechanism advantageously reduces latency (at the trade-off of increased copies of the data), since a security check is not required for every access to the resource 201 by another user 103b. This can be particularly significant when the server system is potentially assessing many access requests across many resources.

Note that for the owner of the resource 201, i.e. the first user 103a, whose mailbox (or storage area) 107a the primary copy 201l is stored in, the manager function 106 does not impose a corresponding security check when this user 103a accesses primary copies of resources in his/her own mailbox 107a.

Preferably the manager function 106 is configured to delete the secondary copy 201ll if there is any change to the primary copy 201l which means the second user is no longer to be permitted access, e.g. the primary copy is deleted, or the second user 103b is removed from the access control list 620.

Further, in embodiments, access to some of all of the other metadata 203, 204 may be governed by the same access control list 620 as the respective resource 201 itself. E.g. if the second user 103b wishes to view when the resource was last modified or last accessed, he/she can only do so if permitted access to the resource 201 by the access control list 620. Further, any subsequent modifications to the resource may be governed by the same access control list 620. I.e. the second user 103b can only view any modifications to the resource 201 if permitted access to the resource by the list 620, and if still permitted access after the modification.

According to further alternative or additional of embodiments, the manager function 106 may be configured with a fail-safe mechanism. That is, if its read to the permissions metadata 620 fails—e.g. returns a corrupted or apparently empty access control list—then the manager function 106 blocks access to the resource, i.e. the requesting second user 103b does not gain access and a secondary copy is not established in the mailbox 107b of that user 103b.

In yet further alternative or additional embodiments, to improve the security at write time, the manager function 106 is configured to perform the permission check twice when the second user 103b is initially granted access: once at the transmit side and once at the receive side. That is, when the instance 106i of the manager function 106 governing the first user's mailbox 107a (the transmit side) receives the request for access from or on behalf of the second user 103b, it performs the security check against the permissions list 620 before setting up the relationship between the second user 103b and the resource 201 in the graph. Then, at replication by the instance 106ii of the manager function 106 governing the second user's mailbox 107b (the receive side), the receive-side instance 106ii of the manager function 106 performs the check again before finally establishing the secondary copy 201ll in the second user's mailbox 107b.

The above provides a security model used for the graph-based storage and partitioning platform discussed previously. The graph security model defines a security model for supporting and enforcing access control of content in a distributed graph with replication of content across shards. It optimizes read performance when a user accesses his/her own shard which may include access controlled content replicated into the user's graph. No security trimming is needed in that case. But when a user accesses a shard that he/she doesn't own, security trimming is performed.

The owner of the mailbox 107 (storage area or "shard") has full access to shard data, but access control lists (ACLs) are provided on nodes to control access by others. The model is based on per-user security claims. The scheme provides an active directory which is an authoritative source of user claims. To roll-out the model, external security models may be mapped to the graph ACLs prior to ingestion.

Every entity has an access control List (ACL) composed of claim-level entries (ACE). The mechanism is designed to fail securely, by interpreting empty or corrupt ACL as private.

Extensions on an entity are guarded by the same ACL as the entity. Relationships on an entity are guarded by the same ACL as the entity.

The mailbox owner has read access to every item in his/her mailbox. Security checks are performed before accepting a primary copy. Security checks are also perform before establishing a secondary copy. Existing secondary copies are deleted if access is revoked.

In embodiments, the system supports secure access to someone else's mailbox through REST (representational state transfer). There are separate non-owner query path (slower) with per-entity security trimming. I.e. the query that is executed when the querying user is not the owner of the relevant fragment of the graph is slower because the system needs to perform security trimming. If the user is the owner on the other hand, the system does not need to trim because by definition he/she has read access to everything in his/her graph.

In yet further alternative or additional embodiments, relationships can be private or public. As discussed above, relationships between users and resources are defined by an action (such as view or modify) performed by a user on the resource. In embodiments there are some such relationships that should only be known to the actor of the relationship. An example of such a private relationship is that Bob viewed one of Alice's files, but Bob is in Alice's legal department (or such like) and the legal department has classified the view relationship/action to be private. This means only the viewer should see it and no one else. However, if Bob explicitly modifies one of Alice's files, wherein the resulting modify relationship is not private, then the modification will be visible to everybody that has read access to Alice's file. According to embodiments disclosed herein, public relationships are stored on the primary copy of the resource, whilst private relationships are stored only in the copy in the actor's mailbox 107.

An example use case illustrating the above techniques is as follows. If Alice retrieves data from her own mailbox (or rather the system on behalf of Alice), no security trimming is needed. When Alice retrieves data from Bob's shard, here claims need to be retrieved. Some of the data in Bob's shard is private and skipped. Other data is ACL'ed, and Alice has access only to some of this.

Further techniques for improving latency in a permissions check operation are now discussed. These may be used in the context of the graph based storage system discussed above, and are described in this context in the following by way of example. However, note that these techniques are not limited to such a context, and more generally may apply in any computer system which is storing the data of a given user and checking whether access to that data is permitted to one or more other users.

According to a first of these techniques, the access control list 620 comprises both a list of multiple individual users who are permitted to access the respective resource, and a list of one or more user groups permitted to access the respective resources, where the individually identified users may or may not overlap with the members of the identified group(s), but the two sets of users are not identical, and there are fewer groups identified than individual users. This means the list of group IDs is smaller than the list of individual user IDs, but also that just because a given user is not a member of one of the permitted groups, this does not tell for sure that the user is not permitted access to the resource 201 in question.

Embodiments make use of such a scenario to reduce the latency of a permissions check. In such embodiments, the manager function 106 initially reads from the access list 620 only the group list and not yet the individual user list. If it determines the requesting user 103b is a member of one of the identified groups (i.e. having a group ID in the group list of the ACL 620), then it allows access and establishes the secondary copy 201ll in the mailbox 107b of the requesting (i.e. second) user 103b, without ever reading the list of individual users. Otherwise it resorts to reading the whole access control list 620 to determine whether the user ID of the requesting user 103b is listed individually in the access control list 620.

In a second technique, the manager function 106 is configured so as when it initially establishes the primary instance 201l in the mailbox 107a of the owner (i.e. first user) 103a, to generate a reduced-size (but imperfect) representation 625 of the access control list 620 and to store this as part of the permissions metadata in the primary copy 201l in the first user's mailbox 107a. The manager function 106 also regenerates the representation 625 and restores it in the respective metadata of the primary copy 201l in the first user's mailbox 107a whenever a modification is made to the primary copy 201l that alters any of the permissions in the access control list 620.

The reduced size representation 625 is "lossy" compared to the actual full list 620, i.e. not a perfect representation, and therefore it cannot be used to safely determine that the requesting user 103b is permitted access to the respective resource. However, it is also smaller, and in a fail-safe system it can be used to determine that the requesting user 103b is not permitted access to the respective resource 201. Hence in embodiments, the manager function 106 is configured to initially read only the reduced size representation 625, and not the full access control list 620, and determine whether it can decide based on that alone that the requesting user 103b is to be denied access. If so, it denies access, but otherwise the manager function 106 resorts to reading the full list 620.

One example that can be used for the reduced size representation 625 is a Bloom filter. A Bloom filter is a bit field or data structure that represents a set of values in such a way that, if used to determine whether a candidate value is part of the set, the Bloom filter will never give a false negative but may give a false positive. I.e. it can falsify a proposition as to whether a candidate is a member of the set, but it cannot verify whether the candidate is a member of the set with 100% certainty. In embodiments, the manager function 620 is configured to generate a Bloom filter representation 625 from the access control list 620 list when it is initially stored and whenever modified in such a way as to change the permissions, and to store this in the metadata 610 of the primary copy 201l of the respective resource. Subsequently, when an access request is received for the respective resource, the manager function first tries comparing the requesting user's ID only against the Bloom filter representation 625 of the list 620. If this allows it to determine that the requesting user 103b is not a member of the list, the manager function 106 denies access to the respective resource 201l and does not establish the secondary copy 201ll in the requesting user's mailbox 107b; but otherwise the manager function 106 resorts to reading the full list 620 and makes the determination based on this.

In another variant, the reduced size representation 625 comprises a hash of the access control list 620. Similarly to the above, the manager function 620 is configured to generate a hash value 625 from the access control list 620 list when it is initially stored and whenever modified in such a way as to change the permissions, and to store this in the metadata 610 of the primary copy 201l of the respective resource. Further, the manager function 625 is configured so as, each time it encounters a value of the hash 625 when performing the permission check for a given requesting user 103b, and determining that user 103b is denied access to the resource 201 associated with the hash value 625, it keeps a record of that hash value in association with the ID of the requesting user 103b in question. Then, whenever the manager function 106 encounters the same hash value again, it can determine that the requesting user is to be denied access based on reading the hash value 625 alone. Only if it has not encountered the hash value before does the manager function 106 resort to reading the whole access control list.

This exploits the fact the access control lists 620 for different resources 201 may tend to be the same. For example when querying the resources in the folder, site or workspace of a certain first user 103a, many of his/her resources 201 may tend to have the same permissions.

Theoretically there is not a unique one-to-one mapping between the output hash values and all possible values of the input data (in this case all possible access control lists 620 that could be specified)—i.e. in principle the same access control list 620 could map to the same hash value. However, in practice, there is a practically unique one-to-one mapping, in that the chance of a collision is negligibly small. Nonetheless, for safety, the hash 625 is only used herein to make a negative decision to deny access, and is never used on its own to make a positive decision to allow access.

A combination of any two or more of the above techniques may also be used.

All these techniques involve initially reading a smaller amount of metadata than the whole access control list 620, where, while this smaller amount of metadata is not always determinative as to whether the requesting user 103b is permitted access, it is sometimes sufficient to make a decision. For example, the reduced representation 625 may not necessarily be able to be used to make a 100% safe determination that the requesting user 103b is allowed access, but it can potentially still be used to determine that the requesting user 103b is not allowed access. If this turns out to be the case, the manager function 106 can make a decision without having to incur the latency of a full read of the access control list 620, which for a long list may incur many I/O operations. For example, in embodiments, the smaller amount of information used to make the negative decision (e.g. the group list, Bloom filter or hash) may fit into a single disk page, whereas reading the full list 620 may require multiple disk pages. This advantageously reduces the number of I/O operations required to perform a permissions check.

Such techniques are particularly advantageous when performing access requests across many resources, potentially thousands or more. Bear in mind that the request from or on behalf of the second user 103b requesting access to the resource 201 does not necessarily target only that one individual resource in particular. For instance, the request may take the form of a request to browse all resources in a specified folder, site, or workspace of the first user 103a. Each time such a request is received, the access check may need to be performed on each individual resource in the folder, site or workspace; since different resources within the folder, site or space in question may have different permissions.

It will be appreciated that the above embodiments have been described by way of example only.

More generally, according to one aspect disclosed herein there is provided a server system comprising: a separate storage area for each of a plurality of parties including a first party and a second party, wherein the storage area of the first party stores a primary instance of each of one or more respective data resources of the first party, and wherein at least one or some of the resources are access controlled, the respective primary instance of each of the access controlled resources including permissions metadata specifying which one or more others of the parties are permitted access to the respective resource; and a manager function configured to perform operations of: in response to a request for the second party to access at least one of the resources of the first party, performing a permission check comprising reading the permissions metadata included in the respective primary instance stored in the first user's storage area, and therefrom determining whether the second party is specified as being permitted access; and on condition that the second user is determined to be permitted access according to said permission check, establishing a secondary copy of said one of the resources of the first party in the respective storage area of the second party; wherein the manager function is configured so as, once the secondary copy is established in the storage area of the second party, to allow the second party to access the respective resource by means of the secondary copy without undergoing another permission check against the permissions metadata.

In embodiments, the secondary copy may be stored in the storage area of the second party in the form of a link to the resource. Alternatively the secondary copy may be stored on the storage area as an absolute copy comprising a duplication of the content of the primary instance. In embodiments the primary instance may be stored in the storage area of the first party in the form of a link to the resource stored elsewhere. Alternatively the primary instance may be an absolute instantiation comprising the content of the resource stored on the storage area of the first party.

In embodiments, each of one, some or all of the parties, including at least the first and/or second party, may be an individual user. In embodiments, each of one, some or all of the parties, including at least the first and/or second party, may be a group of users.

In embodiments, the permissions metadata may specify one or more of the permitted parties in terms of one or more individual users permitted to access the respective resource, said permission check comprising checking whether the second party is a user is included in the specified individual users.

In embodiments, the permissions metadata may specify at least some of the permitted parties in terms of one or more groups of users permitted access to the respective resource, said check comprising checking whether the second party is a user in one of the specified groups, or checking whether the second party is one of the specified groups.

In embodiments, one or some others of the resources may be public, and the manager function may allow any party access to the respective resource.

In embodiments, one or some others of the resources may be private, and the manager function may not allow any party other than the first party access to the respective resource.

In embodiments, the manager function may not perform the permission check when the first user accesses the primary instance of the resource.

In embodiments, the manager function may be configured so as when the primary instance is deleted in the first user's storage area, to automatically delete the secondary copy from the second user's storage also.

In embodiments, the manager function may be configured so as if the permissions metadata is modified so as to no longer specify the second party, to automatically delete the secondary copy from the second user's storage.

In embodiments, the manager function may be configured so as, if said read returns empty or corrupt permissions metadata, then to fail the permission check by default such that the secondary copy is not established and the second user is not granted access.

In embodiments, access to one or both of: further metadata describing an activity performed in relation to the resource by the first user, and/or any subsequent modifications to said one of the resources, may be controlled according to the same permissions metadata as the respective resource itself.

In embodiments, the secondary copy may comprise relationship metadata describing a relationship between the resource and the first or second party, wherein the relationship can be private or public; and the manager function may be configured so as if the relationship is private to store the relationship metadata only in the primary instance or secondary copy respectively, but if the relationship is public to store the relationship metadata in both the primary instance and the secondary copy.

In embodiments, at least some of the different storage areas, including at least the respective storage areas of the first and second parties, may be implemented on separate server units in separate housings, racks, rooms, buildings or geographic locations.

In embodiments the manager function may be implemented in a distributed form comprising a respective instance of the manager function at each of the server units.

In embodiments, the instance of the manager function on the server unit of the first party may be configured to perform an instance of said permission check in response to the request from the instance of the manager function on the server unit of the second party; and the instance of the manager function on the server of the second party may be configured to perform a second instance of said permission check before establishing the secondary copy in the storage area of the second party.

According to another aspect disclosed herein, there is provided a method comprising: providing a separate storage area of each of a plurality of parties including a first party and a second party; in the storage area of the first party, storing a primary instance of each of one or more respective data resources of the first party, and wherein at least one or some of the resources are access controlled, the respective primary instance of each of the access controlled resources including permissions metadata specifying which one or more others of the parties are permitted access to the respective resource; in response to a request for the second party to access one of the resources of the first party, performing a permission check comprising reading the permissions metadata included in the respective primary instance stored in the first user's storage area, and therefrom determining whether the second party is specified as being permitted access; on condition that the second user is determined to be permitted access according to said permission check, establishing a secondary copy of said one of the resources of the first party in the respective storage area of the second party; and once the secondary copy is established in the storage area of the second party, allowing the second party to access the respective resource by means of the secondary copy without undergoing another permission check against the permissions metadata.

In embodiments the method may comprise operations corresponding to any of the above system features.

According to another aspect disclosed herein, there is provided computer equipment comprising: storage storing data items of a first party, each respective one of the data items comprising a respective data resource of the first party or a link to the resource, and at least one or some of the data items being access controlled wherein each of the access controlled data items further comprises respective metadata comprising a respective permissions list specifying other parties permitted to access the respective data item; and a manager function configured to perform operations of: at least when each of the data items is stored in said storage, including in the respective metadata a supplementary element specifying parties permitted access to the resource with fewer bits than the list; in response to a request from a second party to access at least one of the data items, reading the supplementary element in the respective metadata; without yet fully reading the respective access control list, determining whether a decision can be made as to permitting the second user access to said one of the resources based on the supplementary element of the respective metadata; and if not, reading the full list to determine whether the second party is specified by the list.

In embodiments the computer equipment may comprise a server unit or server system, e.g. a server system in accordance with any of the embodiments discussed above.

In embodiments, the second party may be an individual user, the list may be a list of individual users permitted access to the respective resource, and the supplementary element may comprise an indication of one or more user groups permitted to access the respective resource; and the manager function may be configured to perform said determination as to whether the second party can be excluded on the basis of not being a member of one of the specified user groups.

In embodiments, said supplementary element may comprise a reduced representation of the list, the manager function being configured to generate the reduced representation from the list when the respective data item is stored in said storage or modified with a change to the list; the reduced representation may consists of fewer bits than the list but may also not be infallibly determinative as to which parties are permitted access to the respective resource; and said determining operations which the manager function is configured to perform may comprise: without yet fully reading the access control list, determining whether the second party can be excluded as not permitted access based on the reduced representation, and if so, denying the second party access to said one of the data items; and if the second party cannot be excluded based on the reduced representation, reading the full list to determine whether the second party is identified therein, and if so granting the second party access to said one of the resources, but otherwise denying access.

In embodiments the reduced representation may comprise a Bloom filter generated from the list.

In embodiments, the reduced representation may comprise a hash value generated from the list; and wherein the manager function is configured to perform said determination as to whether the second party can be excluded by: identifying whether the same hash value has been encountered previously in association with a determination that the second user is not permitted access to another of the access controlled data items.

Other applications and variants of the techniques disclosed herein may become apparent to a person skilled in the art once given the present disclosure. The scope of the present disclosure is not limited by the above-described embodiments but only by the accompanying claims.

The invention claimed is:

1. A server system comprising:
a separate storage area for each of a plurality of parties including a first party and a second party, wherein:
a first storage area of the first party stores a primary instance of a data resource of the first party,
the data resource is access controlled, and
the primary instance of the data resource includes permissions metadata, the permissions metadata comprising a permissions list that specifies which of the plurality of parties are permitted access to the data resource and a reduced size representation of the permissions list;
a memory storing instructions; and
a processor coupled to the memory, wherein upon execution of the instructions by the processor, the processor is operable to:
in response to a request for the second party to access the data resource of the first party, perform a permission check comprising reading the permissions metadata included in the primary instance stored in the first storage area, and therefrom determining whether the second party is specified as being permitted access, wherein reading the permissions metadata comprises:
initially reading the reduced size representation of the permissions list to determine whether a decision can be made as to permitting the second party access to the data resource; and
if no decision can be made based on the reading of the reduced size representation of the permissions list, reading at least a portion of the permissions list to determine whether the second party is specified by the permissions list; and on condition that the second party is determined to be permitted access according to the permission check, establish a secondary copy of the data resource of the first party in a second storage area of the second party;
wherein, once the secondary copy is established in the second storage area, the processor is operable to allow the second party to access the data resource by means of the secondary copy without undergoing another permission check against the permissions metadata.

2. The server system of claim 1, wherein the permissions metadata specifies which of the plurality of parties are permitted access to the data resource in terms of one or more individual users permitted to access the respective resource, the permission check comprising checking whether the second party is a user that is included in the one or more individual users.

3. The server system of claim 1, wherein the permissions metadata specifies which of the plurality of parties are permitted access to the data resource in terms of one or more groups of users permitted to access the respective resource, the permission check comprising checking whether the second party is a user included in the one or more groups, or checking whether the second party is one of the one or more groups.

4. The server system of claim 1, wherein the data resource is public, and the processor is operable to allow any party access to the data resource.

5. The server system of claim 1, wherein the data resource is private, and the processor is operable to limit access to the data resource to the first party.

6. The server system of claim 1, wherein the processor is operable to withhold performance of the permission check when the first party accesses the primary instance of the data resource.

7. The server system of claim 1, wherein the processor is further operable to automatically delete the secondary copy from the second storage area when the primary instance is deleted in the first storage area.

8. The server system of claim 1, wherein the processor is further operable to automatically delete the secondary copy from the second storage area if the permissions metadata is modified so as to no longer specify the second party as one of the plurality of parties permitted access to the data resource.

9. The server system of claim 1, wherein the processor is further operable to fail the permission check by default if the reading of the permissions metadata returns empty or corrupt permissions metadata such that the secondary copy is not established and the second party is not granted access to the data resource.

10. The server system of claim 1, wherein access to one or both of further metadata describing an activity performed in relation to the data resource by the first party, and/or any subsequent modifications to the data resource, are controlled according to a same permissions metadata as the data resource itself.

11. The server system of claim 1, wherein: the secondary copy comprises relationship metadata describing a relationship between the data resource and the first party or the second party, wherein the relationship can be private or public; and wherein the processor is further operable to store the relationship metadata only in the primary instance or the secondary copy respectively if the relationship is private, and store the relationship metadata in both the primary instance and the secondary copy if the relationship is public.

12. The server system of claim 1, wherein at least some of the separate storage areas, including at least the first storage area of the first party and the second storage area of the second party, are implemented on separate server units in separate housings, racks, rooms, buildings or geographic locations.

13. The server system of claim 12, wherein the processor is implemented in a distributed form comprising a respective instance of the processor at each of the server units.

14. The server system of claim 13, wherein the instance of the processor on a first server unit of the first party is operable to perform an instance of the permission check in response to the request from the instance of the processor on a second server unit of the second party; and the instance of the processor on the second server unit of the second party is configured to perform a second instance of the permission check before establishing the secondary copy in the second storage area of the second party.

15. A method comprising:
providing a separate storage area of each of a plurality of parties including a first party and a second party;
in a first storage area of the first party, storing a primary instance of a data resource of the first party, wherein the data resource is access controlled, and the primary instance of the data resource includes permissions metadata, the permissions metadata comprising a permissions list that specifies which of the plurality of parties are permitted access to the data resource and a reduced size representation of the permissions list;
in response to a request for the second party to access the data resource of the first party, performing a permission check comprising reading the permissions metadata included in the primary instance stored in the first storage area, and therefrom determining whether the second party is specified as being permitted access, wherein reading the permissions metadata comprises:
  initially reading the reduced size representation of the permissions list to determine whether a decision can be made as to permitting the second party access to the data resource; and
  if no decision can be made based on the reading of the reduced size representation of the permissions list, reading at least a portion of the permissions list to determine whether the second party is specified by the permissions list;
on condition that the second party is determined to be permitted access according to the permission check, establishing a secondary copy of the data resource of the first party in a second storage area of the second party; and
once the secondary copy is established in the second storage area of the second party, allowing the second party to access the data resource by means of the secondary copy without undergoing another permission check against the permissions metadata.

16. Computer equipment comprising:
storage storing a data item of a first party, the data item comprising a data resource of the first party or a link to the data resource, and the data item being access controlled, wherein the data item further comprises metadata including a permissions list specifying other parties permitted to access the data item;
a memory storing instructions; and
a processor coupled to the memory, wherein upon execution of the instructions by the processor, the processor is operable to:
  at least when the data item is stored in the storage, include in the metadata a supplementary element specifying parties permitted access to the data item with fewer bits than the permissions list;
  in response to a request from a second party to access the data item, read the supplementary element in the metadata;
  determine whether a decision can be made as to permitting the second party access to the data item based on the reading of the supplementary element of the metadata; and
  if no decision can be made based on the reading of the supplementary element of the metadata, read at least a portion of the permissions list to determine whether the second party is specified by the permissions list.

17. The computer equipment of claim 16, wherein the second party is an individual user, the permissions list is a list of individual users permitted access to the data item, and the supplementary element comprises an indication of one or more user groups permitted to access the data item; and wherein the processor is configured to perform the determination as to whether the second party can be excluded for not being a member of one of the one or more user groups.

18. The computer equipment of claim 16, wherein:

the supplementary element comprises a reduced size representation of the permissions list, the processor further operable to generate the reduced size representation from the permissions list when the data item is stored in the storage or modified with a change to the permissions list;

the reduced size representation consists of fewer bits than the permissions list but is also not infallibly determinative as to which parties are permitted access to the data item; and the processor is further operable to:

determine whether the second party can be excluded as not permitted access based on the reduced size representation, and if so, deny the second party access to the data item; and if the second party cannot be excluded based on the reduced size representation, read at least the portion of the permissions list to determine whether the second party is identified therein, and if so grant the second party access to the data item, but otherwise deny access.

19. The computer equipment of claim 18, wherein the reduced size representation comprises a Bloom filter generated from the permissions list.

20. The computer equipment of claim 18, wherein the reduced size representation comprises a hash value generated from the permissions list; and wherein the processor is further operable to perform the determination as to whether the second party can be excluded by: identifying whether the same hash value has been encountered previously in association with a determination that the second party is not permitted access to another data item that is access controlled.

* * * * *